United States Patent Office 3,030,304
Patented Apr. 17, 1962

3,030,304
LUBRICATING COMPOSITIONS
John Scotchford Elliott and Eric Descamp Edwards, London, England, assignors to Castrol Limited, a British company
No Drawing. Filed Feb. 6, 1959, Ser. No. 791,532
Claims priority, application Great Britain Feb. 11, 1958
6 Claims. (Cl. 252—46.7)

This invention is for improvements in or relating to lubricating compositions and is particularly concerned with lubricating compositions having extreme pressure properties especially suitable for the lubrication of hypoid gears, which compositions will operate under conditions of low speed and high torque as well as under conditions of high speed and high load.

It is well known that under certain conditions, e.g. for the lubrication of hypoid gears, it is necessary to employ lubricants containing chemical compounds capable of reacting with metals at high temperatures and under high pressures to form films (e.g. of iron sulphide, iron chloride or iron oxide) which prevent seizure and welding of the metal surfaces. A variety of organic compounds have been suggested for this purpose, including sulphur compounds of various types and containing sulphur in varying degrees of activity. It has generally been found advantageous to use these sulphur compounds in conjunction with lead soaps or organic halogen compounds, or both. It is now recognised that many such lubricants, which behave perfectly satisfactorily under normal operating conditions and even under high loads at high speed, are not satisfactory under conditions of high torque and low speed, e.g. for lubricating rear axles of vehicles operating in mountainous terrain. Under these conditions, certain lubricants, e.g. those containing lead soaps or sulphur in "active" form, tend to cause high rates of wear or, in some cases, "rippling" or "ridging" of the gear teeth, and to promote the rusting of ferrous metal parts in presence of condensed moisture.

On the other hand lubricants which perform well under conditions of low torque and high speed do not necessarily possess adequate load-carrying capacity under high-speed conditions and particularly under conditions of shock loading. In fact the two requirements have been for some time regarded as being conflicting and U.S. Army specification MIL-L-2105, to which most commonly used hypoid rear axle oils have conformed for several years past, represents a compromise.

The practice among motor manufacturers for some time past has been to use lubricants having better E.P. properties under high-speed conditions than the conventional MIL-L-2105 oils for factory fills for passenger cars. After running-in the gears for a certain period on these oils, which generally contain "active" sulphur and sometimes also lead soaps, the rear-axle may be drained and filled with MIL-L-2105 oil. Some of these oils, particularly those containing lead soaps, while providing adequate protection of the gears against scuffing, have been found to give rise to an undesirable amount of wear in antifriction bearings resulting in loss of pre-load with consequent deterioration of the gear and development of noise and other troubles. Furthermore, it is an obvious disadvantage to have different rear axle oils for factory fills for passenger cars and trucks, since confusion may occur and breakdown of heavily-loaded truck axles might take place under low-speed high-torque conditions if lubricated with an oil of the wrong type.

Recent improvements in engine designs have led to increased power output and this, combined with the tendency to increase the hypoid pinion offset, has brought about a very considerable increase in the severity of the operating conditions of the gears of passenger cars. The loading on truck axles has also increased and the high speeds at which many vehicles, particularly military vehicles, operate combined with the heavy loads carried have exposed the limitations of MIL-L-2105 oils both under high-speed conditions of operation and under low-speed high torque conditions.

The need for a universal hypoid axle lubricant suitable for factory fills for passenger cars and at the same time having superior extreme pressure properties to MIL-L-2105 oils both under high-speed and low-speed high-torque conditions has for some time been appreciated, and new full-scale axle test procedures have been devised for the purpose of evaluating such lubricants.

The increased performance required of such lubricants under low-speed high-torque conditions may readily be appreciated by comparing the standard CRC-L-20 test of U.S. military specification MIL-L-2105 with the new CRC-L-37 test. Both tests are carried out using ¾ ton Army truck hypoid rear axle carriers, generally similar in design, the essential differences in test procedure being summarised in the following table:

|  | L.20 | L.37 |
|---|---|---|
| Speed (ring-gear) r.p.m. | 62 | 80±1. |
| Ring-gear torque, in-lbs. | 32,311 | 41,800. |
| Oil temperature | Cycling between 200° and 250° F. | 275±3° F. (constant). |
| Duration, hours | 30 | 24. |
| Running-in procedure | Approx. 20 mins. at 6,000 in-lbs. | None. |

In the L.37 test prior, to the low-speed high-torque test, a high speed low torque test is carried out for 100 minutes at 440±5 r.p.m. and with a ring-gear torque of 9460±150 in-lb., the maximum oil temperature permitted without cooling being 300° F. It will readily be seen that the new test is in several respects, particularly as regards loading and oil temperature, considerably more severe than the old.

For evaluating performance under high-speed conditions a new test, CRC-L-42, has been developed which is likewise more severe than the old CRC-L-19 high-speed axle test of MIL-L-2105 specification. Additionally various severe "shock-loading" tests have been evolved such as the Chevrolet "Bump test" and the Buick "10A test."

In addition to satisfying the requirements of these tests, a universal hypoid axle lubricant must be relatively non-corrosive to cuprous metals at high operating temperatures and must provide adequate resistance to the corrosion of ferrous metals in the presence of water.

We have now found that by employing certain combinations of separate additives in a lubricating oil, effective lubrication of hypoid gears under both high-speed and low-speed high-torque conditions can be obtained, said combination of additives being stable up to 275° F. or even higher. The three separate additives are:

(a) A chlorine-bearing hydrocarbon having a boiling point or decomposition temperature not less than 160° C.

(b) An aliphatic or aryl-substituted aliphatic disulphide which may or may not contain chlorine substantially non-reactive to iron or copper at 100° C., and (c) A dialkyl phosphite.

Alternatively, additive $a$ can be omitted from the composition provided that additive $b$ contains chlorine-substituted aliphatic radicals to provide the chlorine content necessary to confer on the composition the desired extreme pressure properties.

The provision of both chlorine and sulphur by additives $a$ and $b$ is necessary to provide adequate loading under high-speed and shock loading conditions. These additives are well known and have previously been used in combination, e.g. in compositions containing phosphosulphurised esters and fatty oils. However, many such compositions have been found to be unsatisfactory at temperatures of 275° F. and above and to result in extensive sludging due to the thermal instability of these latter materials.

The addition of additive c enables the lubricant to operate satisfactorily under conditions of low-speed and high-torque and this addition not only does not interfere with the action of additives a and b but actually enhances it, especially under conditions of shock loading.

According to the present invention there is provided a lubricating composition comprising a mineral lubricating oil having incorporated therein additives a, b and c, to confer extreme pressure properties on the composition a being a chlorine bearing hydrocarbon having a boiling point or decomposition temperature not less than 160° C., b being an aliphatic or aryl-substituted aliphatic disulphide which may or may not contain chlorine and c being a dialkyl phosphite or alternatively a minor proportion of additives b and c only when b is a chlorinated aliphatic disulphide, the additive b being substantially non-reactive to iron or copper at 100° C.

A suitable chlorinated aliphatic disulphide b may be prepared by reacting a chlorinated kerosine or a chlorinated paraffin wax with an alkali metal disulphide in such amount as to replace a minor proportion of the chlorine atoms by disulphide groups.

When additive a is present it is preferably a compound containing not less than about 30% by weight of chlorine, this being preferably not directly attached to an aromatic nucleus.

Examples of additive a are:

Chlorinated paraffin wax,
Chlorinated kerosine,
Hexachlorethane,
Benzene hexachloride,
Chlorinated terpenes,
Chlorinated indenes,
Dichlordiphenyltrichlorethane (DDT) and
Chlorinated diphenyls.

Examples of additive b are:

Dibenzyl disulphide,
Monochlor-dibenzyl disulphide,
Dichlordibenzyl disulphide,
Di-t-butyl disulphide,
Diamyl disulphide,
Dilauryl disulphide.

It is to be understood that when additive a is present in the composition the alkyl or aryl-substituted alkyl groups may contain halogen substituents. A suitable chlorinated disulphide which can be employed in compositions according to the present invention is, for example, dichlor-dibenzyl disulphide.

Examples of additive c are:

Diethyl phosphite,
Di-isopropyl phosphite,
Di-n-butyl phosphite,
Dioctyl phosphite,
Dilauryl phosphite.

These phosphites have the formula:

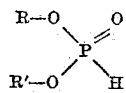

where R and $R^1$ are the same or different alkyl groups. Preferably R and $R^1$ have at least three carbon atoms.

Additives a, b and c or additives b and c are preferably employed in an amount to provide at least 0.5% by weight of chlorine, 0.3% by weight of sulphur, and 0.1% by weight of phosphorus, respectively in the lubricant. More preferably the additives are present in an amount to provide between 1 and 4 percent by weight of chlorine, between 0.5 and 2 percent by weight of sulphur and between 0.15 and 0.5 percent by weight of phosphorus.

Lubricating compositions according to the present invention while giving satisfactory lubrication of hypoid gears under both high-speed and low-speed high-torque conditions, do not provide sufficient protection of the gears and axle housing etc. in the presence of moisture. Inhibition of corrosion under these conditions, which is believed to be accelerated by the liberation of hydrogen chloride or chlorine from a, or b (if b contains chlorine), during the actual operation of the gears, is quite a problem and requires special additives which are compatible with the other additives present and which do not interfere with their functions.

In a preferred form of the present invention there is included in the lubricating composition a further compound, additive d, an oil-soluble basic alkaline earth metal sulphonate which may or may not be neutralised with a weak acid, e.g. carbon dioxide. We have found that compounds d are very effective corrosion inhibitors being greatly superior to the neutral sulphonates which have but little anti-corrosive action in combination with additives a, b and c.

Additive d is preferably employed in an amount of at least 0.05% and more preferably in an amount of from 0.1 to 0.5%, by weight on the weight of the total composition. Examples of additive d are:

Basic barium petroleum sulphonate,
Basic calcium petroleum sulphonate,
Basic strontium petroleum sulphonate,
Basic barium dinonyl naphthalene sulphonate, and
Basic barium didodecyl or octadecyl benzene sulphonate.

Any of these compounds may be neutralized wholly or in part with $CO_2$ to give the corresponding carbonate complex.

There may also be included in the compositions of the present invention antioxidants of which oil-soluble metal dialkyl phosphorodithioates are preferred e.g. zinc dihexyl phosphorodithioate or one of the compounds disclosed in our United States patent application No. 718,496 now abandoned. The antioxidant may be present in an amount of from 0.1 to 1.0% by weight on the weight of the composition.

As additional corrosion inhibitors there may be present aldimines or ketimines obtained by the action of an aldehyde or a ketone on a basic water-soluble primary or secondary mono-amine as described in British patent specification No. 588,864 e.g. dimorpholinyl phenyl methane.

We have further found that the lubricants of the present invention may be improved still further with respect to resistance to breakdown under shock loading conditions by the incorporation in the composition of quite a small amount of an aromatic nitro-compound, preferably a nitrophenol. Thus, for example, we may employ from 0.02 to 0.5 percent of m-dinitrobenzene, α-nitronaphthalene, nitro-p-dichlorbenzene, o-nitrophenol or 2:4 dinitrophenol.

Other additives may also be present, for example, foam inhibitors, pour point depressants and viscosity index improvers.

Following is a description by way of example of two lubricating compositions made in accordance with the present invention (the percentages being on a weight basis).

EXAMPLE 1

A universal hypoid gear lubricant, conforming to S.A.E. (Society of Automotive Engineers) gear oil classification grade 90, was compounded consisting of:

58.0% mineral oil A
25.0% mineral oil B
8.0% mineral oil C
3.7% chlorinated paraffin wax (approx. 40% Cl)

2.8% dibenzyl disulphide
1.4% di-isopropyl phosphite
0.5% mineral oil concentrate containing about 85% of zinc salts prepared from mixed dihexyl and di-isopropyl phosphorodithioic acids in 70:30 ratio (antioxidant A)
0.5% mineral oil concentrate containing about 40% of basic calcium petroleum sulphonate (alkalinity of concentrate about 15 mgs. KOH per gm.) (Corrosion inhibitor A).
0.1% polymethacrylate type pour point depressant Mineral oil A was a solvent-refined brightstock of viscosity about 600 seconds Redwood 1 at 140° F., mineral oil B was a solvent-refined mineral oil of viscosity about 150 seconds Redwood 1 at 140° F. and mineral oil C was a solvent-refined mineral oil of viscosity about 65 seconds Redwood 1 at 140° F. The chlorine, sulphur and phosphorus content of this example is 1.7 percent, 0.86 percent and 0.32 percent, respectively.

EXAMPLE 2

Another S.A.E. 90 hypoid gear lubricant was compounded consisting of:

39% mineral oil D
22% mineral oil A
24% mineral oil E
5% mineral oil C
3% minochlor dibenzyl disulphide
3% benzene hexachloride
2.5% dioctyl phosphite
1.0% mineral oil concentrate containing about 50% of zinc dihexyl phosphorodithioate (antioxidant B)
0.4% mineral oil concentrate containing 45% of basic barium petroleum sulphate neutralised with $CO_2$ (corrosion inhibitor B)
0.1% polymethacrylate type pour point depressant.

Mineral oil D was a conventionally refined brightstock of viscosity about 750 seconds Redwood 1 at 140° F. and mineral oil E was an oil of viscosity about 65 seconds Redwood 1 at 140° F. and viscosity index about 60. The chlorine, sulphur and phosphorus content of this example is 2.6 percent, 0.77 percent and 0.29 percent, respectively.

Further examples were prepared of S.A.E. 90 hypoid gear oils in accordance with the present invention, the mineral oil blends employed being similar to those described in Examples 1 or 2, the amounts of additives incorporated in the composition being as follows:

EXAMPLE 3

4.0% chlorinated paraffin wax (approx. 40% Cl)
3.0% dibenzyl disulphide
1.0% di-isopropyl phosphite
0.5% antioxidant A
0.5% mineral oil concentrate containing about 45% of basic barium petroleum sulphonate (alkalinity about 40 mgs. KOH per grm.). Corrosion inhibitor C.)

The chlorine, sulphur and phosphorus content of this example is 1.7 percent, 0.86 percent, and 0.23 percent respectively.

EXAMPLE 4

4.0% chlorinated paraffin wax (approx. 40% Cl)
3.0% dibenzyl disulphide
1.0% di-isopropyl phosphite
0.2% dimorpholinyl phenyl methane (corrosion inhibitor D)

The chlorine, sulphur and phosphorus content of this example is 1.7 percent, 0.78 percent and 0.19 percent, respectively.

EXAMPLE 5

2.7% chlorinated paraffin wax (approx. 40% Cl)
3.3% monochlor-dibenzyl disulphide
1.4% di-isopropyl phosphite
0.5% antioxidant A
0.5% corrosion inhibitor A The chlorine, sulphur and phosphorus content of this example is 1.5 percent, 0.81 percent and 0.28 percent, respectively.

EXAMPLE 6

2.5% chlorinated paraffin wax (approx. 40% Cl)
3.0% dichlor-dibenzyl disulphide
1.0% di-isopropyl phosphite
0.5% antioxidant A The chlorine, sulphur and phosphorus content of this example is 1.7 percent, 0.83 percent and 0.21 percent, respectively.

EXAMPLE 7

2.0% hexachlorethane
2.0% di-tertiary butyl disulphide
1.5% diethyl phosphite
0.5% mineral oil concentrate containing about 85% of zinc salts prepared from mixed dicapryl and di-isopropyl phosphorodithioic acids (antioxidant C)
0.2% corrosion inhibitor C The chlorine, sulphur and phosphorus content of this example is 1.8 percent, 0.80 percent and 0.38 percent, respectively.

EXAMPLE 8

3.35% dichlordiphenyl trichlorethane
3.0% dibenzyl disulphide
1.5% di-isopropyl phosphite
0.5% antioxidant A
0.5% corrosion inhibitor A The chlorine, sulphur and phosphorus content of this example is 1.7 percent, 0.86 percent, and 0.32 percent, respectively.

EXAMPLE 9

2.5% chlorinated kerosine (50% Cl)
3.0% dichlor dibenzyl disulphide
1.5% di-isopropyl phosphite
0.5% basic barium dodecyl benzene sulphonate (corrosion inhibitor E)
2.0% mineral oil concentrate containing about 45% of mixed barium phosphorodithioates of $C_8$–$C_{10}$ alcohols (antioxidant D)

The chlorine, sulphur and phosphorus content of this example is 1.93 percent, 0.74 percent and 0.40 percent, respectively.

EXAMPLE 10

4.0% chlorinated mixture of di- and polyphenyls (65% Cl)
3.0% dibenzyl disulphide
1.5% di-isopropyl phosphite
0.5% antioxidant A
0.5% corrosion inhibitor A The chlorine, sulphur and phosphorus content of this example is 2.6 percent, 0.86 percent and 0.32 percent, respectively.

EXAMPLE 11

3.7% chlorinated paraffin wax (40% Cl)
3.2% monochlor dibenzyl disulphide
1.4% di-isopropyl phosphite
0.5% antioxidant A
0.5% corrosion inhibitor A
0.1% 2,4 dinitrophenol The chlorine, sulphur and phosphorus content of this example is 1.9 percent, 0.81 percent and 0.30 percent, respectively.

In order to evaluate the performance of various oils as lubricants for hypoid gears operating under conditions of low-speed and high-torque, tests were carried out on the well-known Society of Automotive Engineers (S.A.E.) Machine, modified in a similar manner to that described by McKee, Swindells, White and Mountjoy in the paper presented at S.A.E. National Fuels and Lubricants Meeting, St. Louis, Missouri, November 1949.

The machine was run at constant load for periods up to 12 hours with a main shaft speed of 500 r.p.m. and rubbing ratio 3.4:1, the oil being continuously circulated by means of a pump from a reservoir provided with heating and cooling coils so that the oil could be maintained at a constant temperature (275° F.). The test cups were given a preliminary run-in for 30 minutes at 50 lb. load.

The results of tests on selected compositions formulated in accordance with the present invention are summarized in Table I, together with test results on certain reference oils. The S.A.E. machine test results were assessed on the basis of (1) total weight loss of the test cups (2) surface finish of test cups and (3) sludging of the oil.

In order to obtain a measure of the usefulness of the compositions of the present invention as hypoid gear lubricants under high-speed and "shock-loading" conditions, tests were carried out on the well-known Almen Extreme Pressure Lubricant tester, described by West in the Journal of the Institute of Petroleum, vol. 32, page 220 (1946).

A novel test procedure was used on the Almen machine designed to simulate conditions of shock loading. After starting the machine and loading up to 4000 lbs./sq. inch in the standard manner, the pan and weights were lifted manually a distance of 4 inches and suddenly released, three successive "bumps" being performed at 5 second intervals at each load. If no seizure took place, the procedure was repeated at successive load increments of 1000 lbs./sq. inch until the pin seized. Tests were carried out in duplicate or triplicate.

The results of Almen shock tests are summarized in Table II.

*Table I*

[Oil temperature, 275° F. Load, 250 lbs.]

| Test No. | Lubricant | Test duration (hours) | Total ring weight loss (mgs.) | Condition of test cups | Condition of oil |
|---|---|---|---|---|---|
| 1 | Reference oil A | 5 / 12 | 7 / 21 | Smoothing (top), burnishing (bottom) | Heavy sludging—black deposits |
| 2 | Reference oil B | 3 / 9 | 985 / 1,990 | Heavy wear and ridging | Satisfactory. |
| 3 | Reference oil C | 2½ | 1,490 | Heavy wear, ridging and scoring | Do. |
| 4 | Composition of Example 1 | 12 | 37 | Burnishing (top), slight ridging (bottom) | Do. |
| 5 | Composition of Example 2 | 4 | 118 | Deep ridging in centres of rings | Do. |
| 6 | Composition of Example 3 | 12 | 18 | Slight ridging and rippling (top), burnishing (bottom). | Do. |
| 7 | Composition of Example 4 | 12 | 83 | Similar to Test No. 4 | Do. |
| 8 | Composition of Example 5 | 12 | 105 | Smoothing (top), burnishing (bottom) | Do. |
| 9 | Composition of Example 6 | 12 | 60 | Similar to Test No. 4 | Do. |
| 10 | Composition of Example 7 | 5 | | Light ridging (both) | Moderate sludging. |
| 11 | Composition of Example 9 | 5 | 51 | Burnishing (both) | Do. |
| 12 | Composition of Example 10 | 5 | 57 | do | Do. |
| 13 | Composition of Example 1 without di-isopropyl phosphite. | 4 | 3,150 | Heavy ridging and rippling, metal removal at edges. | Do. |
| 14 | Composition of Example 11 | 5 | 38 | Satisfactory (top), slight burnishing (bottom) | Do. |

NOTE.—The term "satisfactory" in the final column implies no more than slight sludging of the oil.

Referring to Table I, reference oil A was an S.A.E. 90 hypoid gear oil containing the recommended proportion of a commercially available additive and met the requirements of U.S. specification MIL-L-2105. This oil therefore passed the L-20 low-speed high-torque axle test. It was known to fail the new L-37 test, however, due to sludging. This was confirmed by the modified S.A.E. Machine test.

Reference oils B and C were S.A.E. 90 hypoid gear oils containing two different commercially available additives in the proportions recommended to pass both the L-37 and L-42 tests. These oils, though satisfactory as regards sludging and deposit-formation, gave rise to very high wear in the S.A.E. test, whereas the compositions of the present invention gave relatively low wear even under the very severe conditions of this test and, in general, produced no more than a slight increase in surface roughness. The composition of Example 1 successfully passed the L-37 axle test.

Omission of the dialkyl phosphite from the composition of Example 1 (test 13) led to severe surface damage of the rings, this being illustrative of the behaviour of hypoid gear oils containing sulphur and chlorine compounds only. Another such lubricant (reference oil D) containing active sulphur and chlorine and very effective under high-speed operating conditions resulted in a loss of 590 mgs. even at 200 lb. load and 225° F. oil temperature, coupled with ridging, rippling and pitting of the rings. Although various phosphorus-containing additives are effective to a greater or lesser extent in improving the performance of such oils under low-speed high torque operating conditions, we have found the dialkyl phosphites to be outstandingly effective.

*Table II*

ALMEN SHOCK TESTS

| Test No. | Lubricant | Almen shock test results | | | |
|---|---|---|---|---|---|
| | | Failure load (lbs./sq. in.) | Number of bumps | Failure load (duplicate run) | Number of bumps |
| 15 | Reference oil A | Variable results ranging from 4,000–6,000 lbs./sq. in. | | | |
| 16 | Reference oil B | 15,000 | 1 | 15,000 | 0 |
| 17 | Reference oil C | 9,000 | 3 | 10,000 | 3 |
| 18 | Reference oil D | 15,000 | 2 | | |
| 19 | Composition of Example 1 | 9,000 | 3 | 10,000 | 1 |
| 20 | Composition of Example 2 | 9,000 | 2 | 10,000 | 1 |
| 21 | Composition of Example 5 | 10,000 | 2 | 11,000 | 1 |
| 22 | Composition of Example 7 | >15,000 | (¹) | >15,000 | (¹) |
| 23 | Composition of Example 8 | 11,000 | 1 | 11,000 | 3 |
| 24 | Composition of Example 9 | 13,000 | 3 | 14,000 | 1 |
| 25 | Composition of Example 10 | 8,000 | 1 | 7,000 | 3 |
| 26 | Composition of Example 11 | >15,000 | (¹) | >15,000 | (¹) |
| 27 | Composition of Example 1 without di-isopropyl phosphite. | 8,000 | 1 | 9,000 | 1 |
| 28 | Composition of Example 1 without dibenzyl disulphide. | 7,000 | 2 | 8,000 | 1 |
| 29 | Composition of Example 1 without chlorinated paraffin wax. | 6,000 | 1 | 6,000 | 3 |

¹ No failure.

It will be seen from Table II that reference oils B and C containing additives present in sufficient proportions to pass the L-42 test, withstood a substantially greater load than the MIL-L-2105 lubricant, reference oil A, which would fail the L-42 test. Reference oil D withstood a high load, but this oil was of the active sulphur type, suitable for factory fills. The results of the tests on the lubricants according to the present invention show that the lubricants range in effectiveness for the most part between reference oils B and C and in some cases were even better than oil B. Omission of the dialkyl phosphite from the composition of Example 1, a typical lubricant of the present invention, led to a significant reduction in its ability to withstand shock loading conditions, an even greater reduction in load carrying capacity being obtained when either the sulphur-containing compound or the chlorine-containing compound is omitted. The poorest result among the lubricants of the present invention was given by the composition of Example 10, in which the chlorine compound contained chlorine attached to an aromatic nucleus.

In order to investigate the anti-corrosive properties of the lubricants of the present invention, Chrysler-Almen corrosion tests were carried out, this test being designed to give an indication of the behaviour of a hypoid gear oil in service or in the "Moisture Corrosion Axle test" of United States Specification MIL–L–2105. In this test procedure the Almen machine was started and loaded up to 4000 lbs./sq. inch in the standard manner and thereafter run for 25 minutes under this load. The test pieces were then removed, placed in Gooch crucibles standing on watch glasses and allowed to drain in an oven at 180° F. for 30 minutes. The crucibles were then removed and allowed to stand for 24 hours in a desiccator over water and examined for signs of rusting. The results obtained are summarized in Table III.

*Table III*

CHRYSLER-ALMEN CORROSION TESTS

| Test No. | Lubricant | Corrosion of Pin | Corrosion of Bushes |
|---|---|---|---|
| 30 | Reference oil A | None [1] | Slight.[1] |
| 31 | Reference oil B | Fairly heavy | Fairly heavy. |
| 32 | Reference oil C | None | Very slight. |
| 33 | Composition of Example 1 | ----do---- | None. |
| 34 | Composition of Example 2 | ----do---- | Very slight. |
| 35 | Composition of Example 3 | ----do---- | None. |
| 36 | Composition of Example 5 | One or two spots. | Slight. |
| 37 | Composition of Example 8 | None | Do. |
| 38 | Composition of Example 10 | ----do---- | None. |
| 39 | Composition of Example 11 | ----do---- | Do. |
| 40 | Composition of Example 1 without Corrosion Inhibitor A. | Slight | Heavy. |
| 41 | Composition of Example 8 without Corrosion Inhibitor A. | None | Do. |
| 42 | Composition of Example 1 with 0.2% neutral calcium petroleum sulphonate in place of Corrosion Inhibitor A. | Slight | Fairly heavy. |
| 43 | Composition of Example 1 with 0.125% basic barium octadecyl benzene sulphonate in place of Corrosion Inhibitor A. | None | Very slight. |

[1] Heavy wear.

The effectiveness of the corrosion inhibitors $d$ will be seen from the foregoing Table III by comparing tests 33 and 43 with test 40 and test 37 with test 41. The neutral calcium petroleum sulphonate in test 42 was relatively ineffective. It should be pointed out, however, that of the chlorinated hydrocarbons which may be employed as additive $a$ in the present invention some, e.g. hexachlorethane, are more prone to give rise to corrosion than others and may therefore require larger amounts of corrosion inhibitor $d$ to provide adequate protection.

We claim:

1. A lubricating composition consisting essentially of a major proportion of mineral oil having incorporated therein a minor proportion of a chlorine and sulphur-containing additive to provide in the composition between 0.5 and 4% by weight of chlorine and between 0.3 and 2% by weight of sulphur together with a minor proportion of a dialkyl phosphite having a total number of from 4 to 24 carbon atoms in the alkyl groups to provide between 0.1 and 0.5% by weight of phosphorus, to thereby confer on the composition extreme pressure properties; said chlorine and sulphur containing-additive being selected from the group consisting of (1) a chlorinated aliphatic disulphide and (2) a combination of a chlorine-bearing sulphur-free hydrocarbon having a boiling point and decomposition temperature not less than 160° C. with a sulphur-containing compound selected from the group consisting of aliphatic disulphides, aryl-substituted aliphatic disulphides, and chlorinated aryl-substituted aliphatic disulphides, which sulphur-containing compound is substantially non-reactive to iron and copper at 100° C.

2. A lubricating composition as recited in claim 1 wherein chlorine and sulphur are provided by a combination of a chlorine-bearing hydrocarbon having a boiling point and decomposition temperature not less than 160° C. and a sulphur-containing compound selected from the group consisting of aliphatic disulphides, aryl-substituted aliphatic disulphides, and chlorinated aryl-substituted aliphatic disulphides.

3. A lubricating composition as recited in claim 1 wherein chlorine is provided by a chlorine-bearing hydrocarbon selected from the group consisting of chlorinated paraffin wax, a chlorinated kerosene, hexachlorethane, benzene hexachloride, a chlorinated terpene, a chlorinated indene, dichlordiphenyltrichlorethane and a chlorinated diphenyl.

4. A lubricating composition as recited in claim 1 wherein the sulphur is provided by an aliphatic disulphide selected from the group consisting of di-t-butyl disulphide, diamyl disulphide and dilauryl disulphide.

5. A lubricating composition as recited in claim 1 wherein the sulphur is provided by a disulphide compound selected from the group consisting of dibenzyl disulphide, monochloro-dibenzyl disulphide and dichloro-dibenzyl disulphide.

6. A lubricating composition as recited in claim 1 wherein the dialkylphosphite is selected from the group consisting of di-isopropylphosphite, di-n-butylphosphite, dioctylphosphite and dilaurylphosphite.

References Cited in the file of this patent

UNITED STATES PATENTS

| | | |
|---|---|---|
| 2,066,173 | Calcott et al. | Dec. 29, 1936 |
| 2,134,436 | Cantrell et al. | Oct. 25, 1938 |
| 2,208,161 | Prutton et al. | July 16, 1940 |
| 2,294,817 | Van Dijck | Sept. 1, 1942 |
| 2,364,284 | Freuler | Dec. 5, 1944 |
| 2,711,396 | Dorinson | June 21, 1955 |

FOREIGN PATENTS

| | | |
|---|---|---|
| 455,494 | Canada | Mar. 29, 1949 |